Patented Nov. 11, 1930

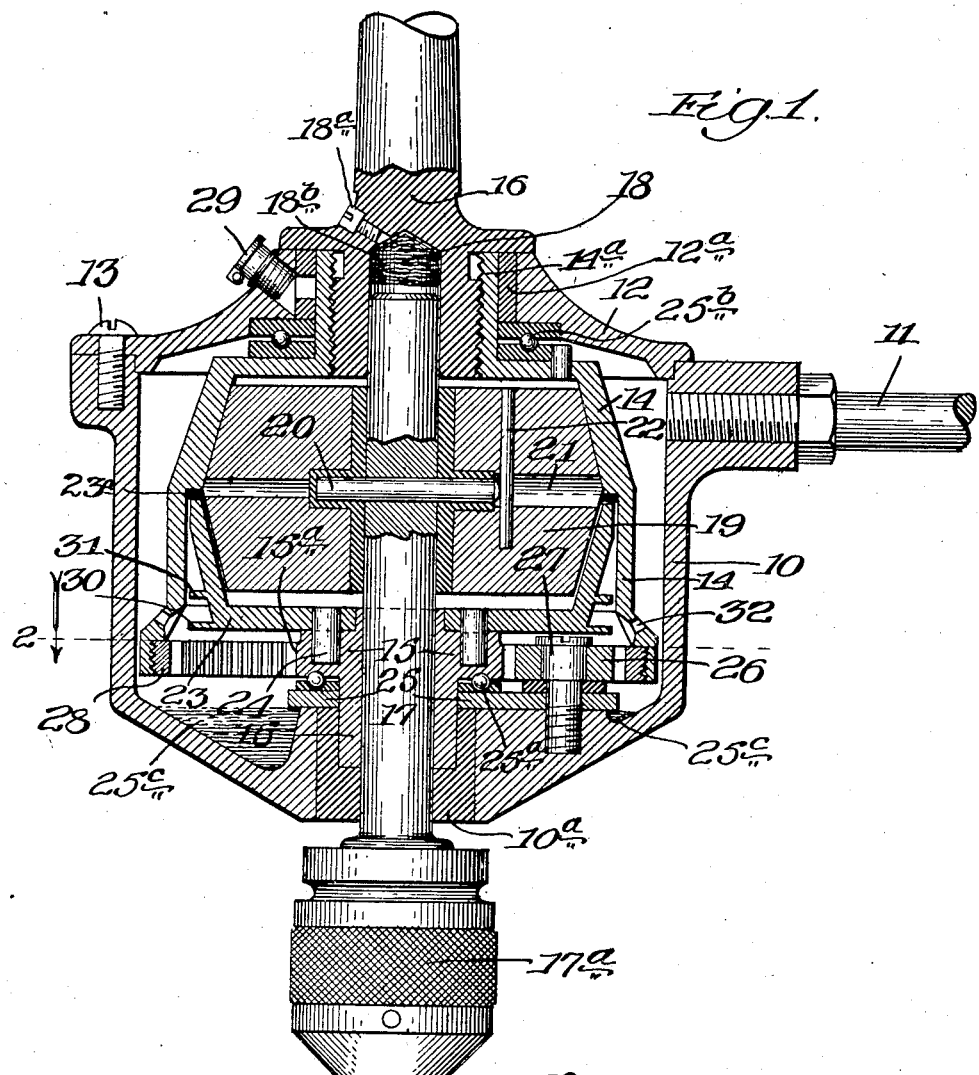
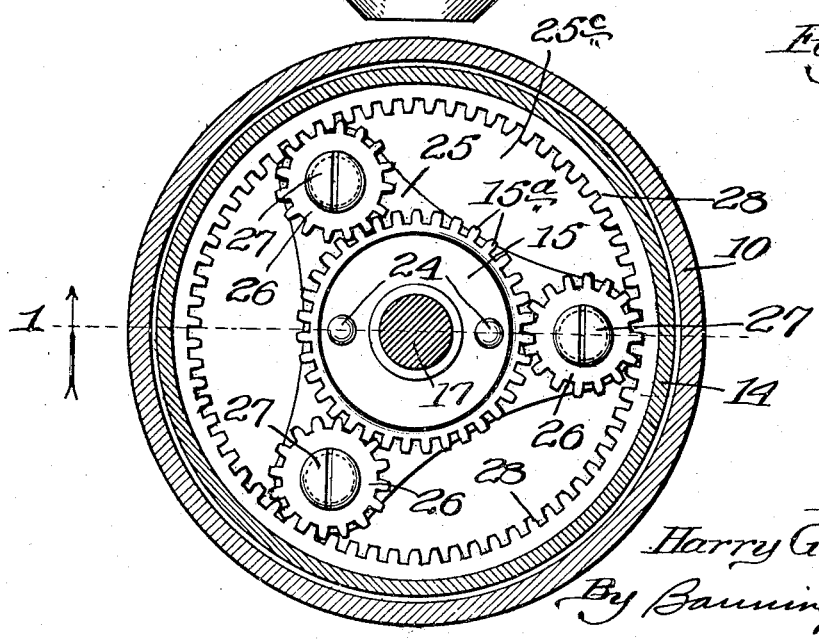

1,781,192

UNITED STATES PATENT OFFICE

HARRY G. PROCUNIER, OF CHICAGO, ILLINOIS, ASSIGNOR TO PROCUNIER SAFETY CHUCK COMPANY, OF CHICAGO, ILLINOIS, A CORPORATION OF ILLINOIS

TAPPING ATTACHMENT

Application filed March 11, 1929. Serial No. 346,137.

An object of this invention is to provide a tapping attachment of a reduced and simplified form, and one which at the same time is efficient and economical to manufacture.

This and other objects as will hereinafter appear are accomplished by this invention which is fully described in the following specification, and shown in the accompanying drawings, in which—

Figure 1 is a vertical longitudinal section on the line 1 of Fig. 2; and

Fig. 2 is a horizontal section on the broken line 2 of Fig. 1.

The embodiment illustrated comprises a tapping attachment having a hollow casing 10 to which is secured an arm 11, which is adapted to engage a fixed portion of the frame of a drill press and the like, on which the tapping attachment may be used. The casing 10 includes a cover 12 which is secured thereto by means of a series of screws 13.

A hollow inverted bowl member 14 has at its upper end a reduced portion 14$^a$ which is journalled in a bushing 12$^a$ in the cover 12. The portion 14$^a$ is tapped to receive a complementary threaded spindle 16 which is adapted to fit into and be gripped by the spindle (not shown) of a drill press or other similar machine in any well known manner. A chuck shaft 17 is journalled in alignment with the spindle 16 in a bushing 10$^a$ in the lower portion of the casing 10, and in the opening 18 in the lower end of the spindle 16. The shaft 17 is secured to a double cone friction member 19 by means of a pin 20, which is insertable through an opening 21 and retained in place by means of a retaining pin 22.

A conical cup member 23 lies beneath the cone member 19, and is secured by means of pins 24 to a hub member 15 which is journalled within the bushing 10$^a$, and which in turn loosely surrounds the shaft 17. The hub 15 carries a gear 15$^a$ which meshes with three equally spaced idler pinions 26 which are journalled upon screws 27, which are secured to the casing 10. These pinions 26 in turn mesh with an internal gear 28 which is screw-threaded into the lower end of the inverted bowl member 14. A hardened steel plate 25 makes contact with each of the screws 27 and forms part of the ball thrust bearing 25$^a$. A main ball thrust bearing 25$^b$ lies between the bowl 14 and the cover 12.

The double cone friction member 19 is tapered to fit into the conical bowl member 14 above it, and into the conical cup member 23 beneath. The shaft 17 is provided at its lower end with a chuck 17$^a$ which is adapted to receive a tap, or the like which is fed into the piece to be tapped in one direction and removed by running the tap in the opposite direction. A fibre ring 23$^a$ lies between the cup 23 and the bowl 14 and prevents these members from coming in contact with each other.

Thus it will be seen that the shaft 17 with its cone member 19 is free to move up and down in the casing so as to bring the cone 19 into engagement with the conical inner surface of the bowl member 14, or the reversely conical inner surface of the cup 23. As shown, the cone 19 is in engagement with the bowl 14, such as would be the case where the tool is lowered against the work (not shown) as during the operation of the tapping. To remove the tap from the work the casing 10 is lifted bodily away from the work, thereby permitting the cone member 19 to fall away from the bowl 14 and to come into frictional engagement with the cup 23. When this happens the shaft is driven in the reverse direction through the operation of the annular gear 28, the idlers 26, and the gear 15$^a$, which keep the cup 23 constantly revolving in the opposite direction from the bowl 14.

The journal 14$^a$ and the ball thrust bearings 25$^b$ are oiled through an oil cup 29 in the cover 12, and the construction is such that oil is prevented from getting on the driving cone 19. This is accomplished by the form of the bowl 14 which entirely surrounds the cone 19, and also by the fact that the cup 23 extends up into the bowl 14, the cup being flared so that any oil which might reach either the inside or outside of the cup 23 would be thrown out by centrifugal force against the enlarged lower portion of the bowl 14, and this oil would then pass by gravity down into the lower portion of the casing 10 where a felt pad 25$^c$ is provided to absorb and hold the oil and thus serve as an oil reservoir for the bushing 10ª, the ball bearing 25ª and the screws 27.

To assist in preventing oil from working up from the bottom of the casing, the cup 23 is provided at its lower end with annular flanges 30 and 31 which further assist in throwing off any oil, thereby preventing it from working up into contact with the engaging surfaces of the frictional clutch members 14, 19 and 23. The oil thrown off from the annular flange 30 is further led to the outside of the bowl 14 through holes 32 therein.

Small quantities of oil may be fed to the upper end of the shaft 17 by removing the screw 18ª and retained by a felt n.emoer 18ᵇ. While this device is shown and described as vertical, it will be understood that it will also operate in a horizontal position.

Thus it will be seen that a very simple, compact and efficient form of tapping attachment is provided. While I have shown and described but a few embodiments of my invention, it is to be understood that it is capable of many modifications. Changes, therefore, in the construction may be made which do not depart from the spirit and scope of the invention as disclosed in the appended claims.

I claim:

1. A tapping attachment comprising a hollow casing having means for preventing rotation thereof, a vertical spindle journalled in the upper portion of said casing and carrying a bowl having an inner conical friction surface, a double cone member lying beneath said bowl and adapted to frictionally engage the conical portion thereof, a chuck shaft journalled in the lower portion of said casing and secured to said cone, a conical cup beneath the cone and journalled to rotate about the axis of the chuck shaft and having an inner conical friction surface adapted to engage with said cone member, said bowl overhanging said cup and substantially enclosing the same, and means interposed between said overhanging bowl and cup for driving said cup in the opposite direction from said bowl.

2. A tapping attachment comprising a hollow casing having means for preventing rotation thereof, a vertical spindle journalled in the upper portion of said casing and carrying a bowl having an inner conical friction surface, a double cone member provided with oppositely directed conical surfaces lying beneath said bowl one of said surfaces being adapted to engage the conical surface of the bowl, a chuck shaft journalled in the lower portion of said casing and secured to said cone, a conical cup beneath the cone and journalled to rotate about the axis of the chuck shaft and adapted to engage the other conical surface of the double cone member, said bowl overhanging said cup and substantially enclosing the same, and means connecting the lower edges of said bowl and cup for driving said cup in the opposite direction from said bowl.

3. A tapping attachment comprising a hollow casing having means for preventing rotation thereof, a vertical spindle journalled in the upper portion of said casing and carrying a bowl having an inner conical friction surface, a double cone member having two exterior conical surfaces, lying beneath said bowl, one of the conical surfaces of the double cone member being adapted to frictionally engage the conical portion of the bowl, a chuck shaft journalled in the lower portion of said casing and secured to said cone member, a conical cup beneath the cone and journalled to rotate about the axis of the chuck shaft and adapted to engage with the other conical surface of the cone member, said bowl overhanging said cup and substantially enclosing the same, and means enclosed substantially by said bowl for driving said cup in the opposite direction from said bowl.

4. A tapping attachment comprising a hollow casing having means for preventing rotation thereof, a vertical spindle journalled in the upper portion of said casing and carrying a bowl having an inner conical friction surface, a double cone member lying beneath said bowl and adapted to frictionally engage the conical portion thereof, a chuck shaft journalled in the lower portion of said casing and secured to said cone, a conical cup beneath the cone and journalled to rotate about the axis of the chuck shaft and having an inner conical friction surface adapted to engage with said cone member, said bowl overhanging said cup and substantially enclosing the same, an internal gear carried by the lower portion of said bowl, a gear concentric therewith carried by said cup, and idler gears connecting the concentric gears and carried by said casing for driving the cup in the opposite direction from said bowl.

5. A tapping attachment comprising a hollow casing having means for preventing rotation thereof, a vertical spindle journalled in the upper portion of said casing and carrying a bowl having an inner conical friction surface, a double cone member lying beneath said bowl and adapted to frictionally engage the conical portion thereof, a chuck shaft journalled in the lower portion of said casing and secured to said cone, a conical cup beneath the cone and journalled to rotate about the axis of the chuck shaft, said bowl overhanging said cup and substantially enclosing the same, means for driving said cup in the opposite direction from said bowl, and means carried by said cup for preventing oil from rising to said cone.

6. A tapping attachment comprising a hollow casing having means for preventing rotation thereof, a vertical spindle journalled in the upper portion of said casing and carrying a bowl having an inner conical friction surface, a double cone member lying beneath said bowl and adapted to frictionally engage the conical portion thereof, a chuck shaft journalled in the lower portion of said casing and secured to said cone, a conical cup beneath the cone and journalled to rotate about the axis of the chuck shaft, said bowl overhanging said cup and substantially enclosing the same, means for driving said cup in the opposite direction from said bowl, and a radial flange on said cup for preventing oil from rising to said cone.

7. A tapping attachment comprising a hollow casing having means for preventing rotation thereof, a vertical spindle journalled in the upper portion of said casing and carrying a bowl having an inner conical friction surface, a double cone member lying beneath said bowl and adapted to frictionally engage the conical portion thereof, a chuck shaft journalled in the lower portion of said casing and secured to said cone, a conical cup beneath the cone and journalled to rotate about the axis of the chuck shaft, said bowl overhanging said cup and substantially enclosing the same, means for driving said cup in the opposite direction from said bowl, and a radial flange on said cup for preventing oil from rising to said cone, said bowl having a series of holes on a level with said flange to carry away any oil thrown off by said flange.

8. The tapping attachment of claim 1 characterized by a wearing member inserted loosely between said cup and bowl to prevent friction between the two when the cone member is moved from engagement with the cup into engagement with the bowl.

9. The tapping attachment of claim 4 characterized by a ball thrust bearing between the cup and casing, said ball thrust bearing having a plate which serves as a support for said idler gears.

10. A tapping attachment comprising a hollow casing having means for preventing rotation thereof, a vertical spindle journalled in the upper portion of said casing and carrying a bowl having an inner conical friction surface, a double cone member lying beneath said bowl and adapted to frictionally engage the conical portion thereof, a chuck shaft journalled in the lower portion of said casing and secured to said cone, a conical cup beneath the cone and journalled to rotate about the axis of the chuck shaft, said bowl overhanging said cup and being provided with a depending skirt which substantially encloses the same, means for driving said cup in the opposite direction from said bowl, and an outwardly projecting portion at the bottom of said skirt to cause removal of oil therefrom.

11. A tapping attachment comprising a hollow casing having means for preventing rotation thereof, a vertical spindle journalled in the upper portion of said casing and carrying a bowl having an inner conical friction surface, a double cone member lying beneath said bowl and adapted to frictionally engage the conical portion thereof, a chuck shaft journalled in the lower portion of said casing and secured to said cone, a conical cup beneath the cone and journalled to rotate about the axis of the chuck shaft, said bowl overhanging said cup and being provided with a depending skirt which substantially encloses the same, means for driving said cup in the opposite direction from said bowl, said skirt having an outwardly projecting portion at its lower edge, and an outwardly projecting flange carried by said cup for preventing oil from rising to said cone.

In testimony whereof, I have hereunto set my hand this 8th day of March, 1929.

HARRY G. PROCUNIER.